United States Patent
Wang et al.

[19]

[11] Patent Number: 5,903,712
[45] Date of Patent: May 11, 1999

[54] INK SEPARATION DEVICE FOR PRINTING PRESS INK FEED CONTROL

[75] Inventors: Xin Xin Wang, Woodridge; Robert Nemeth, Darien, both of Ill.

[73] Assignee: Goss Graphic Systems, Inc., Westmont, Ill.

[21] Appl. No.: 08/539,649

[22] Filed: Oct. 5, 1995

[51] Int. Cl.$^6$ ............................................. G06K 15/00
[52] U.S. Cl. ..................... 395/109; 101/211; 101/365; 101/366; 364/526; 347/6; 358/504
[58] Field of Search .................... 395/109, 104, 395/101; 101/211, 483, 484, 470, 471, 365, 170, DIG. 45, DIG. 49, 366, 181, 183; 358/504, 505, 512, 518, 503, 515; 250/316.1, 317.1, 318, 319, 580, 582–584; 364/526, 402, 551.01, 558; 347/6, 19, 5, 15, 43

[56] References Cited

U.S. PATENT DOCUMENTS

| | | | |
|---|---|---|---|
| 2,968,988 | 1/1961 | Fothergill | 88/14 |
| 3,612,753 | 10/1971 | Korman | 178/5.2 A |
| 3,806,633 | 4/1974 | Coleman | 178/5.2 R |
| 3,958,509 | 5/1976 | Murray et al. | 101/426 |
| 4,468,692 | 8/1984 | Yamada et al. | 358/76 |
| 4,472,736 | 9/1984 | Ushio et al. | 358/75 |
| 4,481,532 | 11/1984 | Clark et al. | 358/80 |
| 4,494,875 | 1/1985 | Schramm et al. | 356/402 |
| 4,505,589 | 3/1985 | Ott et al. | 356/402 |
| 4,539,647 | 9/1985 | Kaneko et al. | 364/526 |
| 4,583,186 | 4/1986 | Davis et al. | 364/526 |
| 4,649,502 | 3/1987 | Keller et al. | 364/519 |
| 4,685,139 | 8/1987 | Masuda et al. | 382/1 |
| 4,713,684 | 12/1987 | Kawamura et al. | 358/78 |
| 4,716,456 | 12/1987 | Hosaka | 358/75 |
| 4,752,822 | 6/1988 | Kawamura | 358/80 |
| 4,758,885 | 7/1988 | Sasaki et al. | 358/80 |
| 4,802,107 | 1/1989 | Yamamoto et al. | 364/525 |
| 4,809,061 | 2/1989 | Suzuki | 358/75 |
| 4,830,501 | 5/1989 | Terashita | 356/402 |
| 4,837,711 | 6/1989 | Suzuki | 364/523 |
| 4,839,719 | 6/1989 | Hirota et al. | 38/75 |
| 4,891,690 | 1/1990 | Hasegawa et al. | 358/75 |
| 4,907,076 | 3/1990 | Ohsawa | 358/80 |

(List continued on next page.)

FOREIGN PATENT DOCUMENTS

| | | |
|---|---|---|
| 0 142 470 B1 | 10/1984 | European Pat. Off. . |
| 0 601 259 A1 | 12/1992 | European Pat. Off. . |
| 649842 A5 | 6/1985 | Switzerland . |

OTHER PUBLICATIONS

Graphic Microsystems, Inc., Advertisement for Autosmart™ Software.
Graphic Microsystems, Inc., *Autosmart II Version 10.0 User's Manual*, pp. 1–2.
Heidelberg, *Technical Series . . . 2 Stop Guessing About Color*.

*Primary Examiner*—Dwayne Bost
*Assistant Examiner*—Tracy M. Legree
*Attorney, Agent, or Firm*—Marshall, O'Toole, Gerstein, Murray & Borun

[57] ABSTRACT

An ink separation device for a printing press ink feed control having a device for printing a color chart having randomly distributed color patches, and recording the cyan, magenta, yellow and black ink dot sizes (CMYK) for each color patch, a device for measuring the red, green, blue and infrared reflection value (RGBI) from each color patch, and recording the RGBI value for each of the color patches, a device for defining a transfer function which maps a four-dimensional RGBI vector into a four-dimensional CMYK vector, a device for forming RGBI measurements over a reference copy, and transferring each of the RGBI measurements into the corresponding CMYK ink dot size value, a device for forming RGBI measurements over a production copy, and transferring each of the RGBI measurements into the corresponding CMYK ink dot Size value, a device for forming the dot size ratio between the production copy and the reference copy to form the ink volume ratio between the reference and production copies and a device for adjusting and ink feed rate of the press.

26 Claims, 13 Drawing Sheets

U.S. PATENT DOCUMENTS

| | | | |
|---|---|---|---|
| 4,908,712 | 3/1990 | Uchiyama et al. | 358/298 |
| 4,910,593 | 3/1990 | Weil | 358/113 |
| 4,926,254 | 5/1990 | Nakatsuka et al. | 358/76 |
| 4,947,348 | 8/1990 | Van Arsdell | 345/109 |
| 4,949,284 | 8/1990 | Watanabe | 364/520 |
| 4,967,264 | 10/1990 | Parulski et al. | 358/44 |
| 4,967,379 | 10/1990 | Ott | 364/526 |
| 4,975,862 | 12/1990 | Keller et al. | 364/526 |
| 5,029,107 | 7/1991 | Lee | 364/518 |
| 5,045,937 | 9/1991 | Myrick | 358/109 |
| 5,053,866 | 10/1991 | Johnson | 358/75 |
| 5,068,810 | 11/1991 | Ott | 364/526 |
| 5,087,126 | 2/1992 | Pochieh | 356/402 |
| 5,089,977 | 2/1992 | Pflästerer et al. | 364/526 |
| 5,120,624 | 6/1992 | Takanashi et al. | 430/47 |
| 5,121,196 | 6/1992 | Hung | 358/75 |
| 5,122,977 | 6/1992 | Pfeiffer | 364/551.01 |
| 5,157,506 | 10/1992 | Hannah | 358/298 |
| 5,163,012 | 11/1992 | Wuhrl et al. | 364/552 |
| 5,166,755 | 11/1992 | Gat | 356/419 |
| 5,166,789 | 11/1992 | Myrick | 358/109 |
| 5,175,772 | 12/1992 | Kahn et al. | 382/1 |
| 5,181,081 | 1/1993 | Suhan | 356/394 |
| 5,181,257 | 1/1993 | Steiner et al. | 382/17 |
| 5,182,721 | 1/1993 | Kipphan et al. | 364/526 |
| 5,206,707 | 4/1993 | Ott | 356/402 |
| 5,224,421 | 7/1993 | Doherty | 101/211 |
| 5,283,671 | 2/1994 | Stewart et al. | 358/532 |
| 5,302,833 | 4/1994 | Hamar et al. | 250/561 |
| 5,357,448 | 10/1994 | Stanford | 364/526 |
| 5,363,318 | 11/1994 | McCauley | 364/571.01 |
| 5,404,156 | 4/1995 | Yamada et al. | 347/115 |
| 5,412,577 | 5/1995 | Sainio et al. | 364/469 |
| 5,416,613 | 5/1995 | Rolleston et al. | 358/518 |
| 5,420,945 | 5/1995 | Concannon et al. | 382/312 |
| 5,424,553 | 6/1995 | Morton | 250/548 |
| 5,452,112 | 9/1995 | Wan et al. | 358/504 |
| 5,459,678 | 10/1995 | Feasey | 358/504 |
| 5,479,189 | 12/1995 | Chesavage et al. | 345/154 |
| 5,481,380 | 1/1996 | Bestmann | 358/504 |
| 5,483,359 | 1/1996 | Yumiba et al. | 358/513 |
| 5,483,360 | 1/1996 | Rolleston et al. | 358/518 |
| 5,493,518 | 2/1996 | Keating | 364/578 |
| 5,508,810 | 4/1996 | Sato | 358/296 |
| 5,509,086 | 4/1996 | Edgar et al. | 382/167 |
| 5,509,115 | 4/1996 | Butterfield et al. | 395/147 |
| 5,521,722 | 5/1996 | Colvill et al. | 358/500 |
| 5,528,377 | 6/1996 | Hutcheson | 358/298 |
| 5,530,656 | 6/1996 | Six | 364/526 |
| 5,604,586 | 2/1997 | Bahr et al. | 356/244 |

Camera: Single CCD
with Built in Filters

5,903,712

INK SEPARATION DEVICE FOR PRINTING PRESS INK FEED CONTROL

BACKGROUND OF THE INVENTION

The present invention relates to control systems for a printing press.

The mainstream of color printing encompasses the use of four printing inks (cyan, magenta, yellow and black). These inks are printed on paper one at a time to form a four color image. The printer will also print a series of single ink control targets in the page margin to aid in the control of the ink feed rate. Densitometers are commonly used to measure the cyan, magenta, yellow and visual densities from these areas. Conversions may exist to convert these corresponding density values to estimates of the ink present. However, when measurements are taken from a single ink control target, image quality cannot be inferred since differences in dot gain will not contribute to the solid ink densities measured by such a device. Other image quality variances caused by press behaviors such as ghosting, will not be detected in the densities measured from the control target. In addition, it is undesirable to use a control target due to the extra paper required for its printing and the effort needed to remove it from the final product.

Color monitor systems exist that measure the image area, where multiple inks are present. These systems use three channel sensors such as a color camera. These systems generally provide an overall score indicating the quality of color match between reference and production copies. The quality of match is generally presented as the difference in sensor space of red, green, blue or cyan, magenta and yellow between these two copies. When an operator is presented with this information, human judgment is involved in translating this information to the control of a specific ink on the printing press. Automated translations from the color difference to the ink content do not exist. This occurs because the working range of the device is limited to the visible region of the spectrum where the black ink and three color process black are indistinguishable. Since the relationship between the color separation and the quantity of ink being printed is not known, systems of this type provide little aid to the operator for control purposes. Monitor systems such as this do not provide closed loop color control.

The technology used in prepress color separation cannot be used in color control of a printing press. In a prepress color separation, an original image is scanned with a three channel color sensor providing reflection values in the red, green and blue spectral regions. The color separation process also determines the amount of cyan, magenta and yellow ink that would be needed to reproduce this original image on a printing press. Knowing that the combinations of these three inks ideally produce black, an algorithm in the color separation system will substitute black for the three inks of cyan, magenta and yellow. This process is usually called Gray Component Removal (GCR). The magnitude of each of the three inks that are subtracted as black is added varies depending on the impurities in the process inks. There are therefore many different combinations of cyan, magenta, yellow and black that can be used to reproduce the original. The task of this prepress color separation is to find one of the color combinations that will reproduce the original image. This can be accomplished by operator preference or other factors. The output of the process does not imply the amount of ink (if any) used on the original scanned image, nor does it imply the amount of ink that has been applied to the paper in an actual printing condition.

Since three channel sensors have posed a problem in determining the quantity of four inks on a printed page, some have devised a four channel sensor in anticipation of overcoming the problem. U.S. Pat. No. 3,376,426 to Frommer (1968) discloses a density monitor system which includes an infrared sensor for detecting the presence of black ink and a linear 4-by-4 subtractive suppression matrix for reducing a secondary affect caused by the impurities of the inks. It is suggested by Frommer that the linear matrix is adjusted for a correct response at one maximum level of density. Since neither the dot gain, the trapping nor the relation between the ink volume and the light reflectance is in a linear form, the output of Frommer's suppression matrix does not represent the amount of ink present on the paper, nor is it his intention. When one or more color inks are mixed with the black ink, the output of this suppression matrix for color inks will exhibit a large degree of error. This large error can cause an ink control system to make adjustments to inks which are not requiring adjustment, or to move inks in the wrong direction, resulting in an unstable system. For this reason, Frommer's system cannot be used to control a printing process in a stable and accurate manner, nor preset the printing press based on a given reference.

U.S. Pat. No. 4,649,502 to Keller (1987) discloses a demask process to determine the surface coverage for each ink by solving extended Neugebauer equations iteratively. The extended Neugebauer equations used in Keller's processing are pure stochastic models which give no consideration to dot gain (called "point increment" by Keller) and trapping factors for different dot sizes. Thus, Neugebauer equations become less accurate, especially when the dot size of one or more inks is in the vicinity of 50 percent, or one ink has a low dot size while the other three inks have high dot sizes. Therefore, Keller's process must further include weighting matrices G1 and G3 to compensate for errors caused by the dot gain and the over-printed colors, respectively. However, these two compensation functions are only used for assigning lower weighting factors to data with lower confidence levels, but not for eliminating the existing errors. Thus, the error produced by the demask process will propagate into the ink feed rate calculation step making the color adjustment processing less accurate. Furthermore, Neugebauer equations describe light reflectance as a function of the ink coverage values, which are independent variables in Neugebauer equations. There is no easy way to reverse the Neugebauer equations so those ink coverage values, which we want to know, can be described explicitly as dependent variables. To find these surface coverage values, a long and complicated iterative process has to be used to solve these multi-variable non-linear simultaneous equations. This process is very time consuming and has to be performed for a large number of measurement elements. This process is also risky since the coefficient matrices of these equations may be singular or ill-conditioned for certain reflectance combinations resulting a very poor solution, or none at all.

In order to adjust the color of currently printing copies on the press so they look substantially like a reference, information should be known about the ink content of the reference and that of the currently printed copy. Adjustments could then be made in the ink feed rate based on this difference. An ink separation process is able to take the sensor data presented when viewing an area with multiple inks and convert it into actual ink content on the page.

SUMMARY OF THE INVENTION

The present invention relates to an ink separation device for a printing press.

The device comprises, means for printing a color chart having randomly distributed color patches, and recording the cyan, magenta, yellow and black ink dot sizes (CMYK) for each color patch, means for measuring the red, green, blue and infrared reflection value (RGBI) from each color patch, and recording the RGBI value for each of the color patches, means for defining a transfer function which maps a four-dimensional RGBI vector into a four-dimensional CMYK vector, means for forming RGBI measurements over a reference copy, and transferring each of the RGBI measurements into the corresponding CMYK ink dot size value, means for forming RGBI measurements over a production copy, and transferring each of the RGBI measurements into the corresponding CMYK ink dot size value, and means for forming the dot size ratio between the production copy and the reference copy to form the ink volume ratio between the reference and production copies.

A principle feature of the present invention is the provision of an improved ink separation process which accurately indicates the amount of each process ink presented on a four color print so that the ink feed rate to a printing press can be adjusted accurately without the need of a printed color control target.

Another feature of the present invention is the provision of an ink separation process which explicitly indicates the amount of each process ink presented on a printed sheet without the need of solving multi-variable non-linear simultaneous equations.

Another feature of the present invention is the provision of an ink separation process which utilizes a set of multi-variable polynomials with many terms being pre-calculated to increase the processing speed.

Yet another feature of the present invention is the provision of an ink separation process which contains enough color reproduction related factors to accurately indicate the actual ink distribution on a printed sheet without the need of additional complicated weighting compensations.

Still another feature of the present invention is the provision of an ink separation process which eliminates the secondary affect caused by the impurity of the printing inks and accurately indicates the amount of each ink on a printed sheet.

A further feature of the present invention is to provide a procedure for developing a set of empirical ink separation formulas based on the actual printing characteristics presented by a color test form.

Yet another feature of the present invention is the provision of a color test form which is easy to print and less sensitive to ink starvation.

Still another feature of the present invention is that the distribution of each of the process inks over a printed copy can be determined by first dividing this printed copy into a plurality of small areas, then measuring the light reflection from each of these areas and finally applying the ink separation process to each of the small areas.

A further feature of the present invention is to provide a method to determine the amount of each ink presented on a reference copy.

Yet another feature of the present invention is to provide a method of presetting a printing press based on a reference copy.

A further feature of the present invention is to provide a method to determine the amount of each ink presented on a production copy.

Yet another feature of the present invention is to provide a method for ink feed rate adjustment based on an ink volume ratio between the production and the reference copies.

Further features will become more fully apparent in the following description of the embodiments of the invention, and from the appended claims.

DESCRIPTION OF THE PREFERRED EMBODIMENTS

Figure 1:
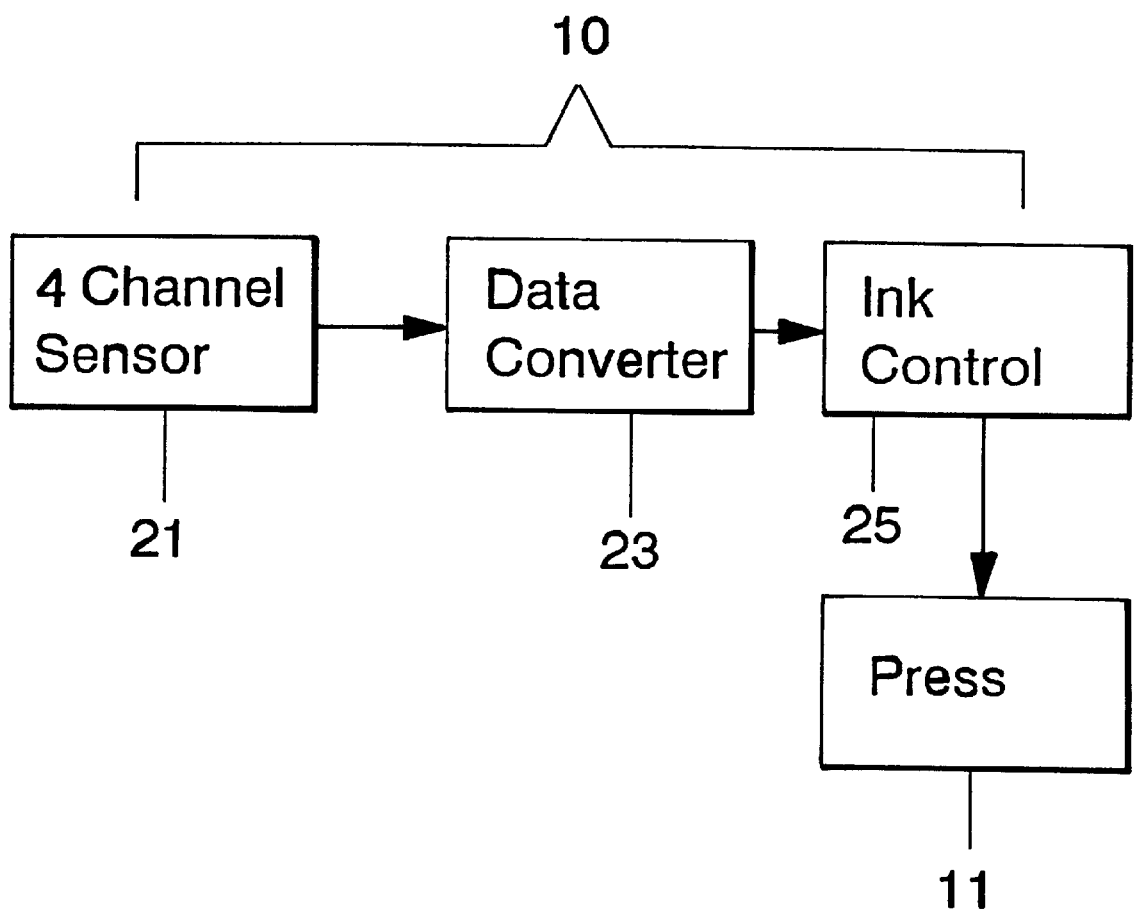
FIG. 1 is a block diagram of a control system for a printing press of the present invention.

Referring now to FIG. 1, there is shown a control system generally designated 10 for a printing press 11 of the present invention.

Figure 8:
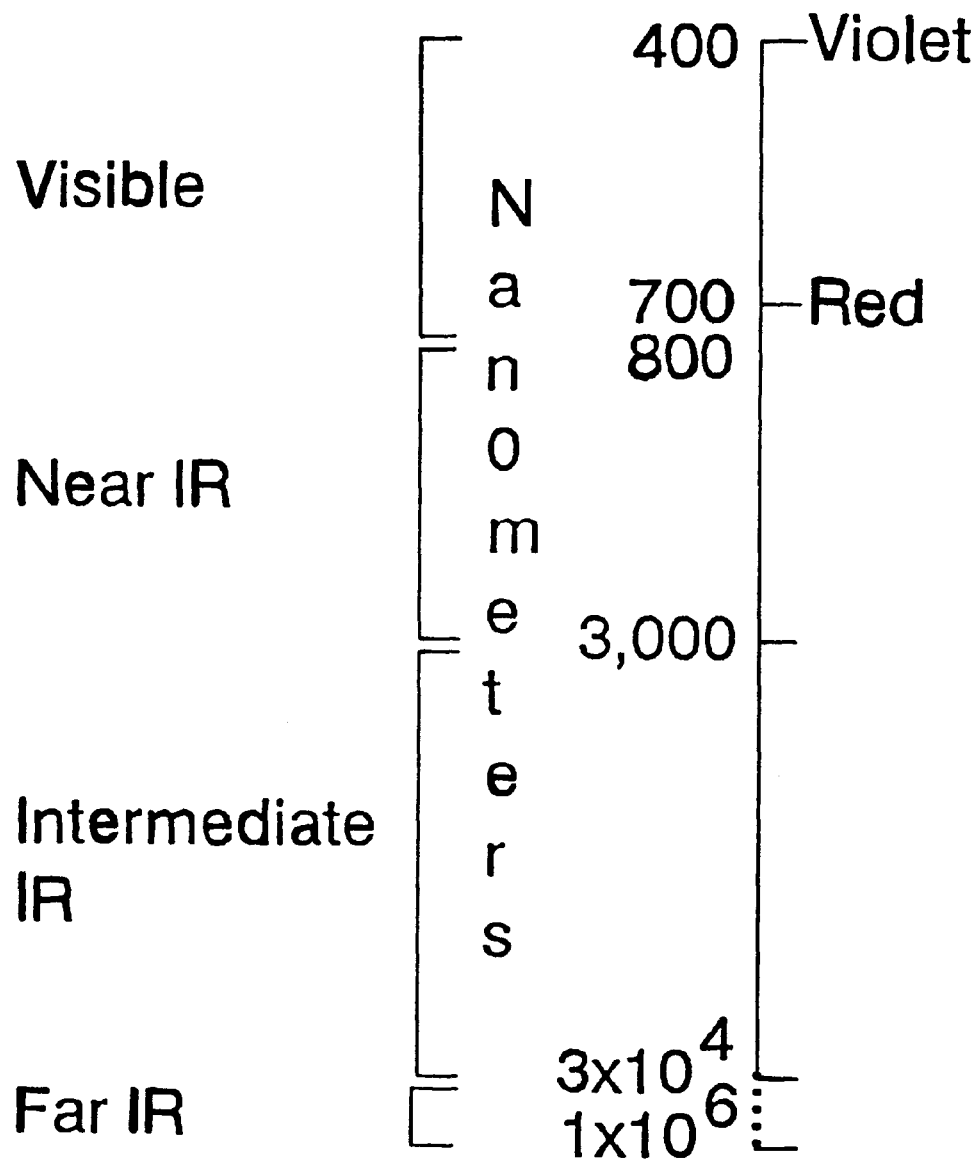
FIG. 8 is a diagrammatic view of a spectrum of electromagnetic waves including the visible spectrum and the infrared spectrum.

The control system 10 has a 4 channel sensor 21, a data converter 23 for processing information from the sensor 21, and a device 25 for controlling the ink feed rate for the press 11. As will be seen below, the 4 channel sensor 21 detects the energy reflected from a paper surface, such as the paper web for the press 11, in both the visible region and the infrared region of the electromagnetic spectrum. As shown in FIG. 8, electromagnetic waves in the infrared region have a longer wave length than the visible spectrum, with the wave lengths of the electromagnetic waves in the region of visible light being approximately 400 to 700 nanometers (nm), and the wave lengths of the electromagnetic waves in the infrared region, including near infrared, being equal to or greater than 800 nm.

Figure 2:
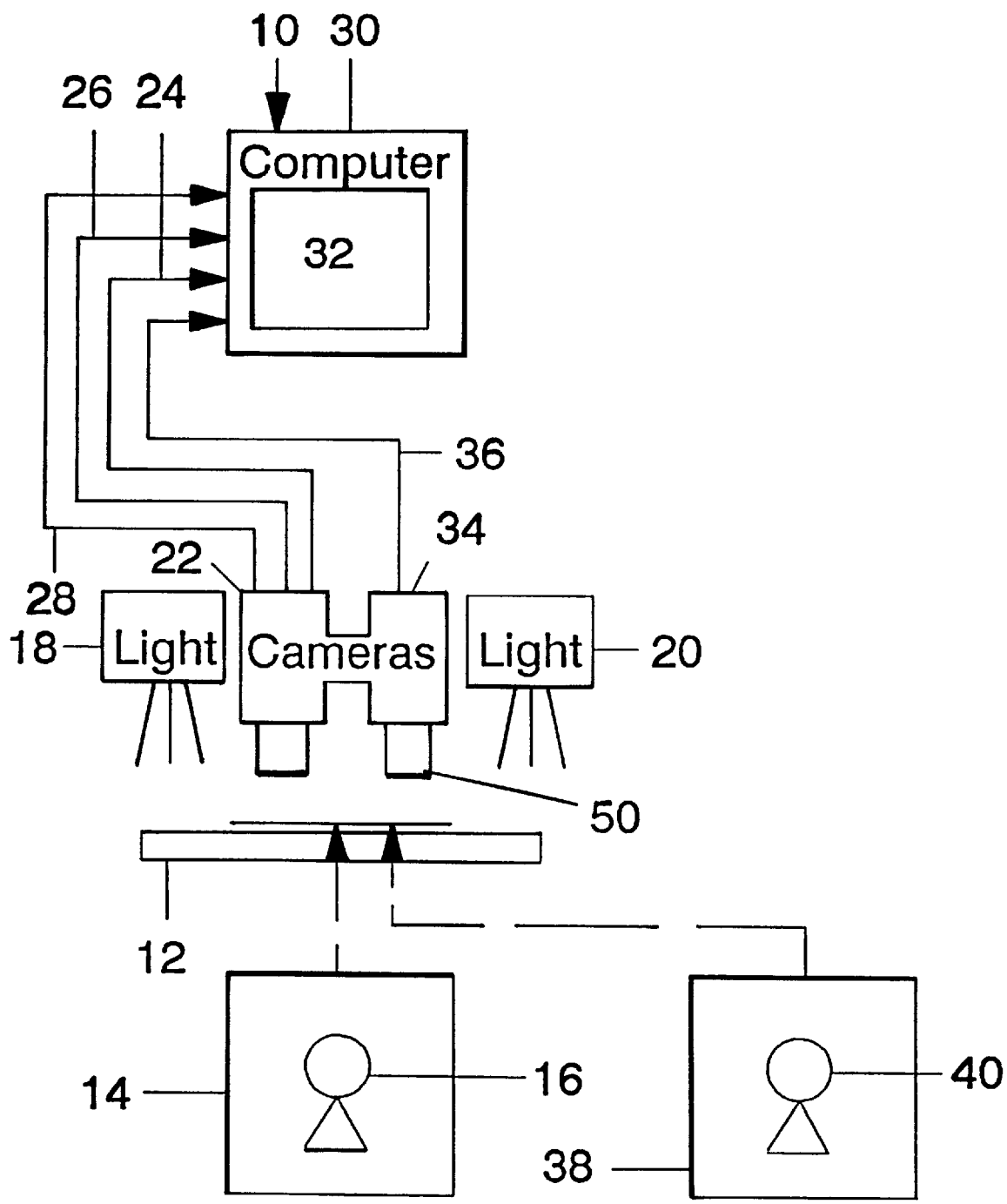
FIG. 2 is a diagrammatic view of the system of FIG. 1.

As show in FIG. 2, the control system 10 has a support 12 for placement of a sheet of paper 14 with image or indicia 16 on the sheet 14 in a configuration beneath a pair of opposed lights 18 and 20 for illuminating the sheet 14, The system 10 has a first color video camera or sensor 22 having three channels for detecting attributes of the inks from the sheet 14 in the visible region of the electromagnetic spectrum such as red, green and blue, or cyan, magenta, and yellow, and for sending the sensed information over separate lines or leads 24, 26, and 28 to a suitable digital computer 30 or Central Processing unit having a randomly addressable memory (RAM) and a read only memory (ROM), with the computer or CPU 30 having a suitable display 32. Thus, the three distinct color attributes of the inks are sensed by the camera 22 from the sheet 14, and are received in the memory of the computer 30 for storage and processing in the computer 30.

The system 10 also has a black/white second video camera or sensor 34 having a filter 50 such that it senses the attributes of the inks in the infrared region of the electromagnetic spectrum, having a wave length greater than the wave length of the electromagnetic waves in the visible region of light. The camera or sensor 34 thus senses infrared information from the sheet 14, and transmits the sensed information over a lead 36 to the computer 30, such that the information concerning the infrared rays is stored in and processed by the computer 30.

Figure 7:
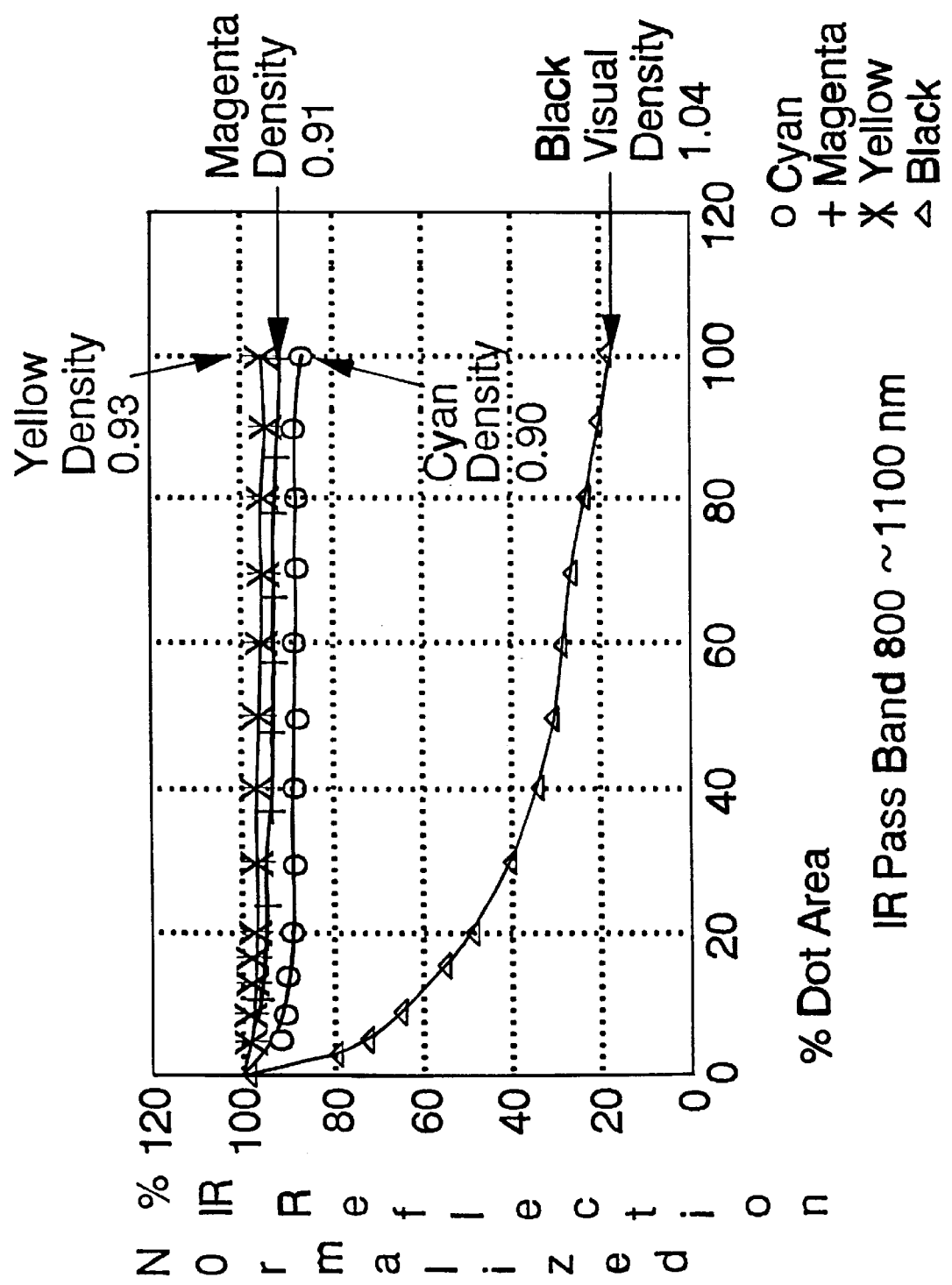
FIG. 7 is a chart plotting the normalized percentage of IR Reflection against the percentage Dot Area in a printed sheet.

The normalized percentage of infrared (IR) reflection vs. the percentage of dot area is show in the chart of FIG. 7. It will be seen that the infrared reflectance of cyan, magenta, and yellow inks show no significant change as a function of percentage of dot area. However, the normalized infrared reflectance of the black ink displays a significant change as a function of percentage of dot area, and changes from a normalized value of 100% IR reflection for 0% dot area to approximately 18% IR reflection corresponding to 100% dot area. Hence, the black ink may be easily sensed and distinguished from other color inks in the infrared region of the electromagnetic waves.

As shown in FIG. 2, the sheet 14 may contain printed image or indicia 16 which is obtained from a current press run of the press 11, termed a production or current copy. In addition, a sheet 38 containing printed image or indicia 40, termed a reference copy, from a previous reference press run may be placed on the support 12 beneath the cameras 22 and 34 in order to sense the energy reflected from the sheet 38, and send the sensed information to the memory of the computer 30 for storage and processing in the computer 30, as will be described below.

Thus, the cameras or sensors 22 and 34 may be used to sense both the current copy or sheet 14 and the reference copy or sheet 38. The information supplied by the cameras 22 and 34 is formed into digital information by a suitable analog to digital converter in a frame grabber board on the computer 30. Thus, the computer 30 operates on the digital information which is stored in its memory corresponding to the information sensed from the sheets 14 and 34 by the cameras or sensors 22 and 34.

Figure 3:
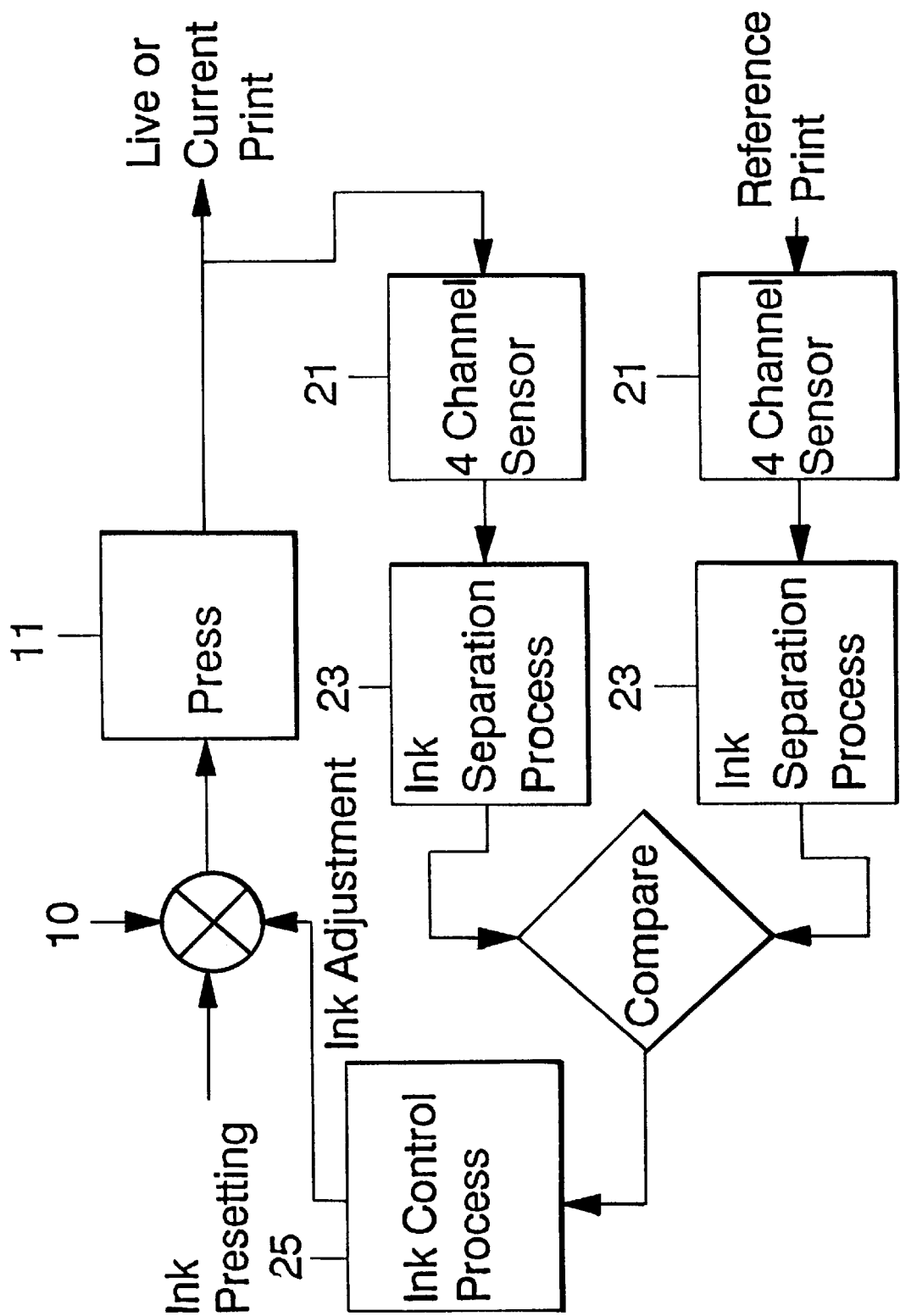
FIG. 3 is a block diagram of the control system of FIG. 1.

Referring now to FIG. 3, there is shown a block diagram of the control system 10 for the printing press 11 of the present invention. As shown, the four inks (cyan, magenta, yellow, and black) of the four-color printing press 11 are first preset, after which a print is made by the press 11 with a current ink setting, thus producing a production or current printed copy, as shown. The color and black/white video cameras or sensors 22 and 34 of FIG. 2 serve as a four channel sensor 21 to capture an image of the current printed copy, and then place this information into the memory of the computer 30 after it has been formed into digital information.

Next, an "Ink Separation Process" 23 is used to convert the red, green, blue and IR images captured by the four channel sensor 21 into four separated cyan, magenta, yellow and black ink images, which represent the amount of corresponding ink presented on the live copy. The "Ink Separation Precess" 23 may utilize mathematic formulas, data look up tables or other suitable means to perform the data conversion task.

The similar processes are also applied to the reference copy. First, the four channel sensor 21 is used to capture the red, green, blue and IR images from the reference copy. Then, the "Ink Separation Process" 23 is utilized to obtain the cyan, magenta, yellow and black ink images, which represent the amount of corresponding ink presented on the reference copy.

As shown, the ink images of the production copy are compared with the ink images of the reference copy by the computer 30 to detect the variation of ink distribution for each of the cyan, magenta, yellow and black inks.

The determined differences in ink distribution are then processed by the computer 30 in order to obtain an indication for controlling the keys or other devices of the press 11 in an ink control process, and thus provide an indication of an ink adjustment to the press to obtain further copies which will have a closer match to the reference copy. The indication of ink changes may be automatically supplied to the press 11, or the operator may utilize the indications of ink color attributes to set the press 11, such as adjustments to ink input rate by using the keys.

In the past, four process inks (cyan, magenta, yellow, and black) have been used on a printing press to produce copies with a gamut of colors. In these systems, the black ink has been used to generate not only the text but also the color image. In a control by image system, the print image of a production copy is compared with the printed image on a reference copy, termed a proof, and the press is adjusted based on the difference between the production image and the reference image. However, within the visible region, it is not possible to reliably distinguish the black ink from the process black made by the combination of cyan, magenta, and yellow inks, or whether the black ink or all cyan, magenta, and yellow inks should be adjusted.

The four channel sensor 21 is utilized to sense not only attributes in three channels of the visible region, the fourth channel of the sensor 21 senses an attribute in the infrared region in order to determine the correct amount of inks, including black ink, to correctly reproduce the proof. The printing press control system uses the four channel detector or sensor 21 to detect the energy reflected from a paper surface, such as the sheets 14 and 38, or the paper web of the press 11, with three channels being in the visible region and one channel being in the infrared region of the electromagnetic spectrum. The control system 10 has a device 23 for converting the output of the sensing device 21 to a set of variables which represent the amount of ink presented on the paper for any of the cyan, magenta, yellow, and black inks, and a device 25 responsive to the converting device 23 for adjusting the four-color printing press 11 to maintain the color consistency.

In a preferred form, the bandwidth of the infrared channel may be between 800 nm and 1100 nm, which is a portion of the near infrared region, and which is compatible with a regular silicon detector, although the working wavelength of the infrared channel may be longer than 100 nm. At least three distinct channels are utilized in the visible region which may correspond to red, green, and blue (RGB), or cyan, magenta, and yellow (CMY), or other colors. The bandwidth of each channel in the visible region may be less than 70 nm, more than 100 nm, or any value in between, with channels having a multiple peak in its passing band, such as magenta, being also included.

The sensor device 21 may be constructed from either a single element detector, a one-dimensional (linear) detector, a two-dimensional (area) detector, or other suitable detector structure, as will be seen below. The sensor device may be constructed by adding an additional infrared channel to existing devices, adding an infrared channel to a RGB color camera or a densitometer, or by extending the working band into the infrared region, e.g., adding infrared capability to a spectrophotometer. The light source 18 and 20 used provides sufficient radiated energy in both the visible region and the infrared region, depending upon the sensor working band and sensitivity.

Figure 9:
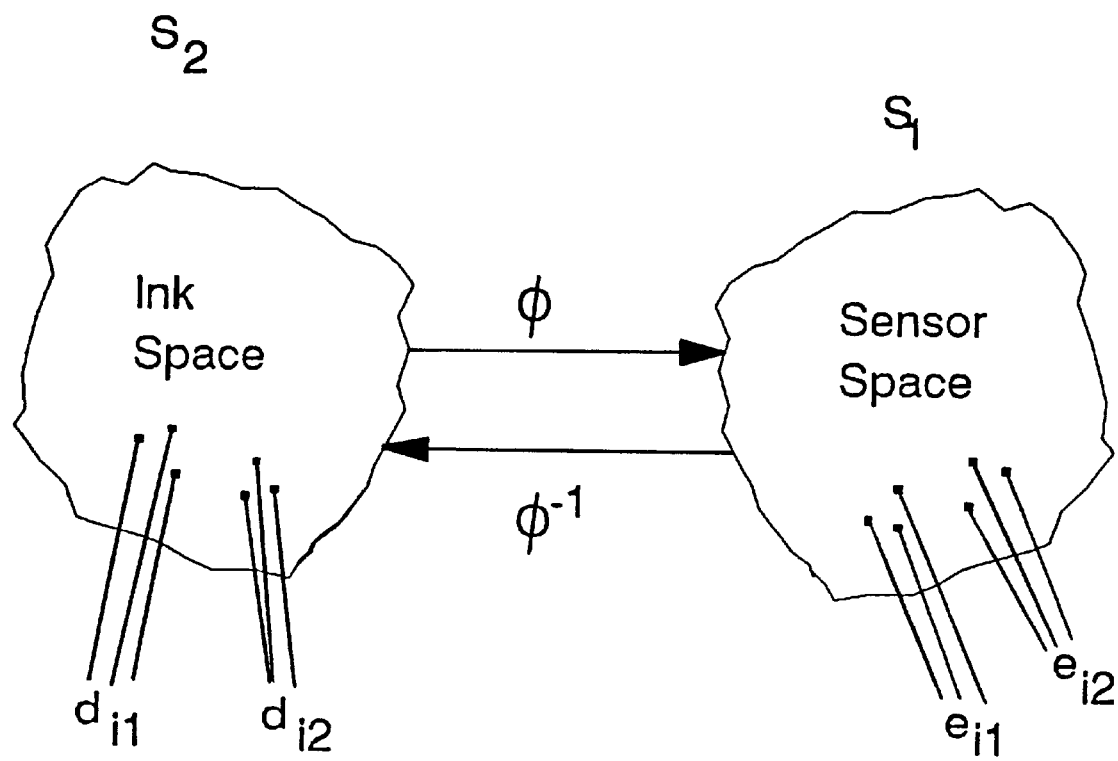
FIG. 9 is a diagrammatic view of set of elements for a sensor space and ink space.

All possible values which are output from the sensor device 21 may be used to form a vector space. For example, all possible values output from the sensor device 21 with red, green, blue and infrared channels form a four dimensional vector space R-G-B-IR, with the vector space being termed a sensor space $S_1$, with each output from the sensor device 21 being termed a vector in the sensor space $S_1$, with the minimum number of dimensions required by the sensor structure being 4. Thus, as shown in FIG. 9, a set $S_1$ of elements $e_{11}$ and $e_{12}$ being given, with the elements $e_{11}$ of the set $S_1$ being the vectors $v_{11}$ corresponding to the output from the sensor device 21 of sensing a production or current printed copy, and with the elements $e_{12}$ of the set $S_1$ being the vectors $v_{12}$ corresponding to the output from the sensor device 21 sensing a reference printed copy. In accordance with the present invention, the printed image on a production or current copy may be compared with the printed image on a reference copy in the sensor space, and if the difference between the live copy L. C.$_S$ and the reference copy R.C.$_S$ is within a predefined tolerance level delta, at least for all the channels in the visible region of the sensor space, such that, $[L.C._S-R.C._S]<$ delta, the production or current copy is said to be acceptable by definition.

A set of variables may be defined to represent the amount of ink presented in a given area. For example, a set of variables C, M, Y, and K can be defined to represent or be a function of the amount of cyan, magenta, yellow, and black ink in a given area. This set of variables may correspond to the ink volume, average ink film thickness, dot size, or other quantities related to the amount of ink in a given area on the paper surface. The vector space formed by this set of variables is termed an ink space $S_2$, with the ink space $S_2$ having a dimension of 4 for a four color printing press 11. Thus, with reference to FIG. 9, a set $S_2$ of elements $d_{11}$ and $d_{12}$ are given, with the elements $d_{11}$ of the set $S_2$ being the vectors $v_{j1}$ corresponding to the variables associated with the production or current copy in the ink space $S_2$, and with the elements $d_{12}$ of the set $S_2$ being the vectors $v_{j2}$ corresponding to the variables associated with the reference copy in the ink space $s_2$.

Figure 10:
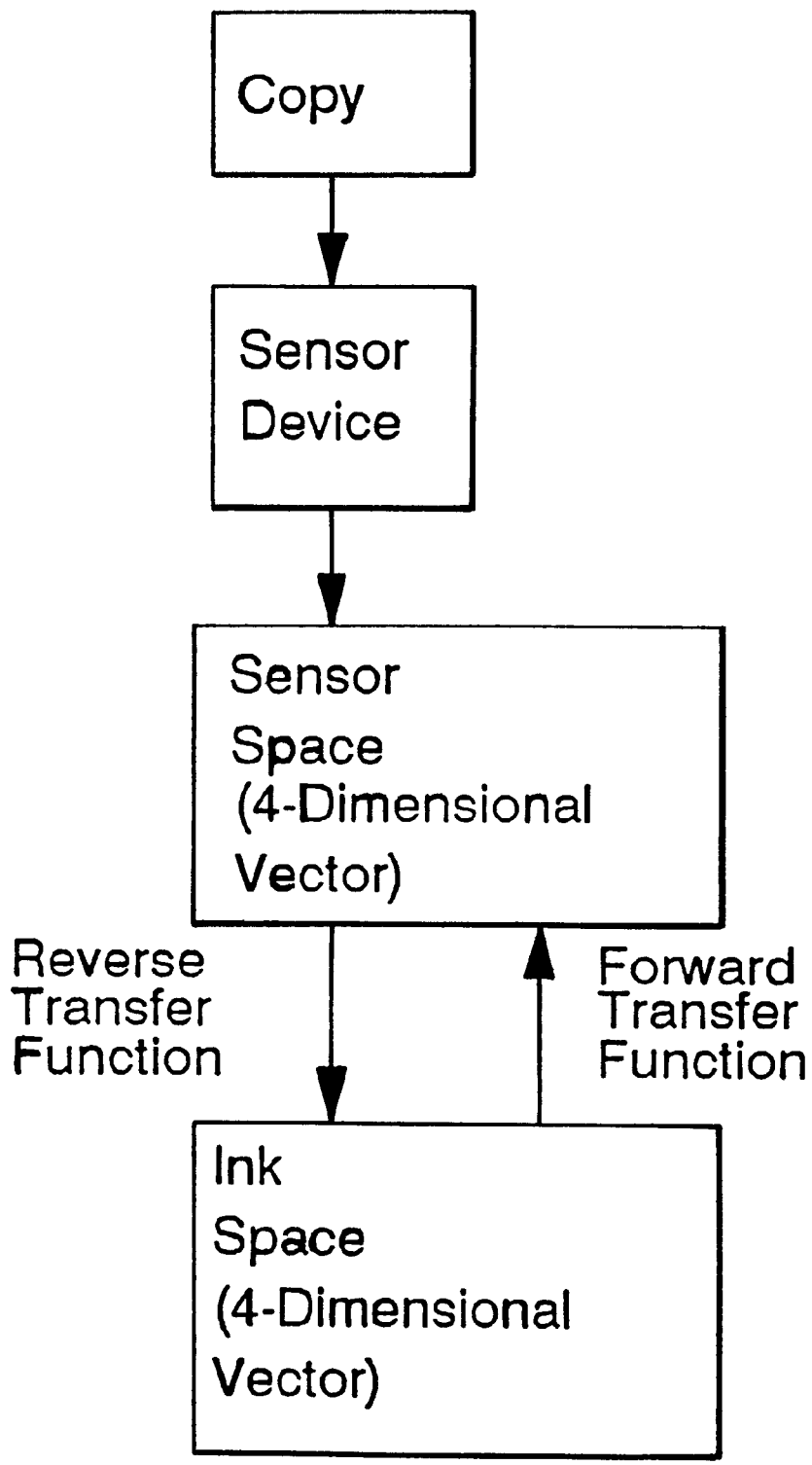
FIG. 10 is a block diagram of the sensor space and ink space in conjunction with the control system of the present invention.

With reference to FIG. 9, there exists at least one transfer function or transformation phi which can map the elements $d_{11}$ and $d_{12}$ of the set $S_2$ or the four dimensional ink space, into the elements $e_{11}$ and $e_{12}$ of the set $s_1$ or the four dimensional sensor space, with the transformation phi being termed a forward transfer function, as shown in FIGS. 9 and 10. It is noted that the subsets in each set $S_1$ and $S_2$ may overlap or may be the same.

The forward transfer function may be used in a soft proof system which can generate a proof image which can be stored in the system as a reference or can be displayed on a CRT screen.

With further reference to FIG. 9, there exists at least one transfer function or reverse transformation phi$^{-1}$ which can map the elements $e_{11}$ and $e_{12}$ of the set $S_1$ of the four dimensional sensor space into the elements of $d_{11}$ and $d_{12}$ of the set $S_2$ of the four dimensional ink space, with the transfer function being termed a reverse transfer function. Thus, both the production image and the reference image in the sensor space or set $S_1$ can be mapped into the ink space or set $S_2$ by applying the reverse transfer function phi$^{-1}$ point by point as shown in FIGS. 9 and 10.

Figure 11:
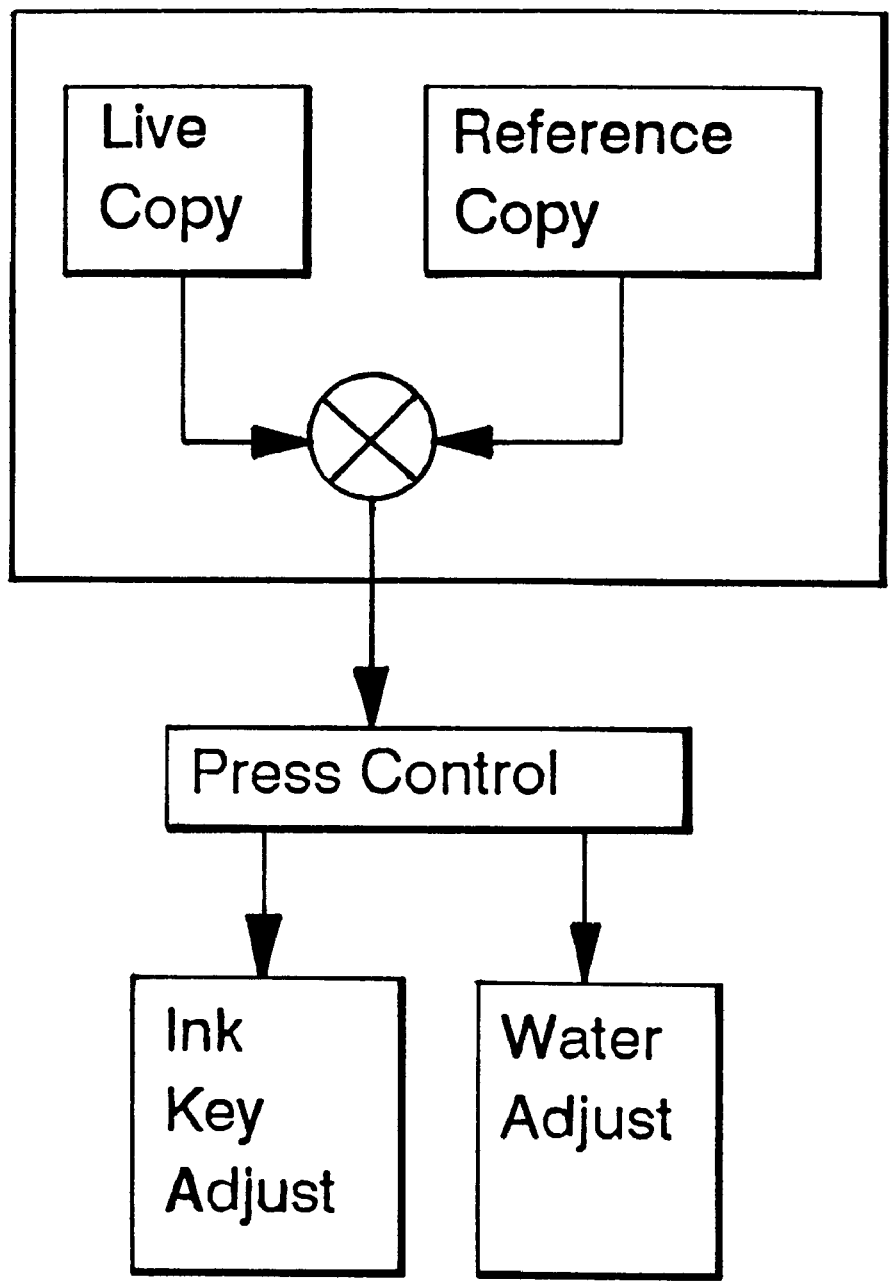
FIG. 11 is a block diagram of the control system for adjusting the printing press.
Figure 12:
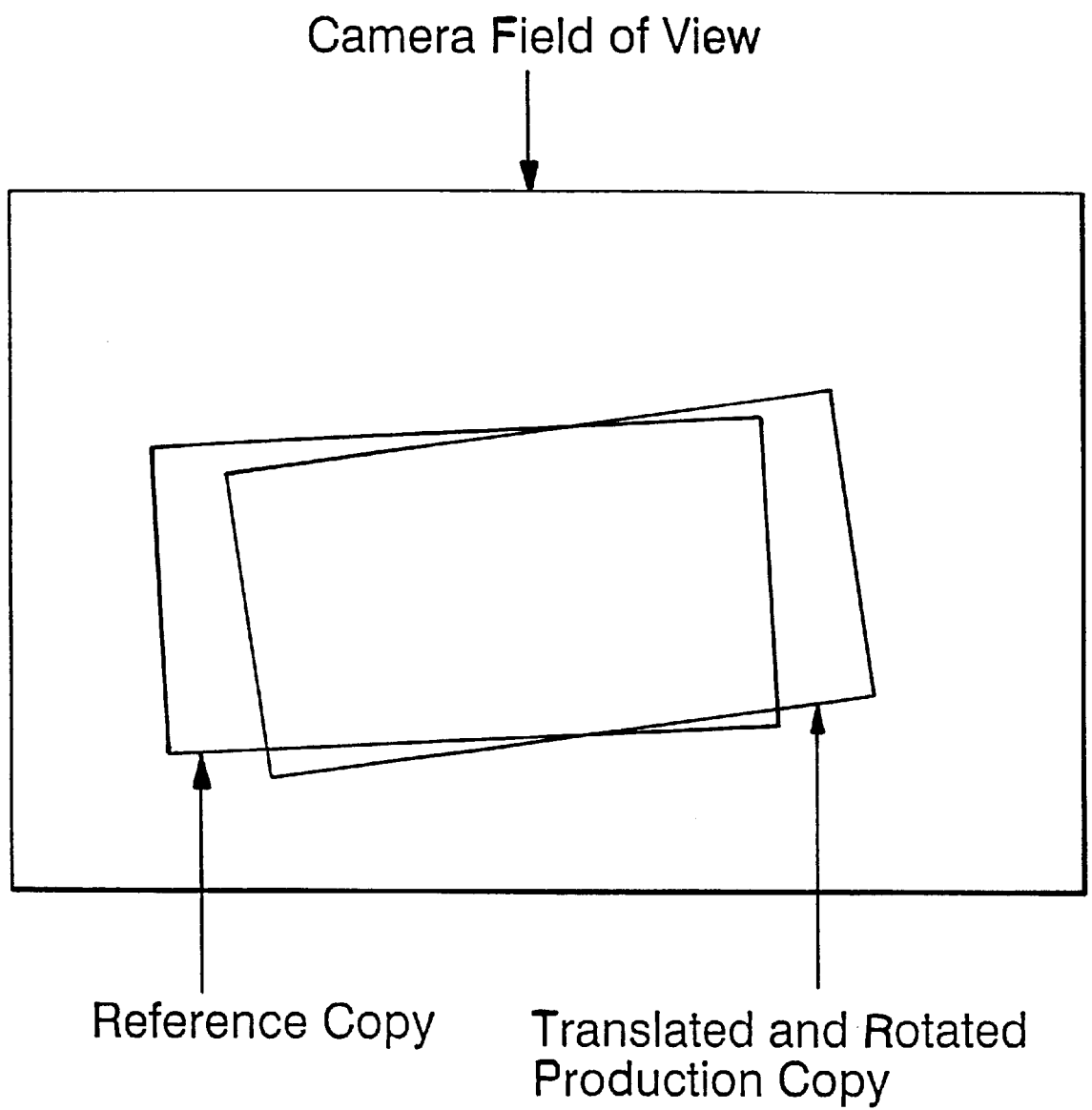
FIG. 12 is a diagrammatic view of a production copy being misaligned with a reference copy.

The difference between the production image and the reference image in the ink space $S_2$ thus represents the difference of the ink distribution for each of the cyan, magenta, yellow, and black inks, as shown in FIG. 11. The difference between the live and reference images in the ink space $S_2$ indicates which printing unit should be adjusted, which direction, up or down, it should be adjusted, and the amount of ink which should be adjusted. A suitable press control formula may be developed to adjust press parameters, such as ink feed rate in lithographic or letterpresses, ink consistency in flexographic or gravure presses, water input rate in lithographic presses, or temperature in any of the above, based on the differences between the production and the reference image in the ink space $S_2$.

In accordance with the present invention, the press adjustments can be achieved by the automatic control system 10, by press operator alone, or by the interaction between the automatic control system 10 and the press operator. Also, the sensor device 21 may be used to monitor the printing web of the press 11 directly, i.e., on press sensing, or to monitor the prints collected from the folder of the press, i.e., off press sensing. If the digital images from the color separation processing, or the film/plate images are available, the image of the reference copy in the sensor device 21 can be generated electronically by the forward transfer function phi. The electronically generated reference may be used to set up the press 11 in order to reduce the make ready time.

The color reproduction quality can be maintained through the entire press run, through different press runs on different presses, or at different times. Thus, a closed loop automatic color reproduction control system may be formed without an additional color control target. The variation of ink, paper, and other press parameters can be compensated such that the printed copies have the highest possible overall results in matching the reference copy.

Figure 4:
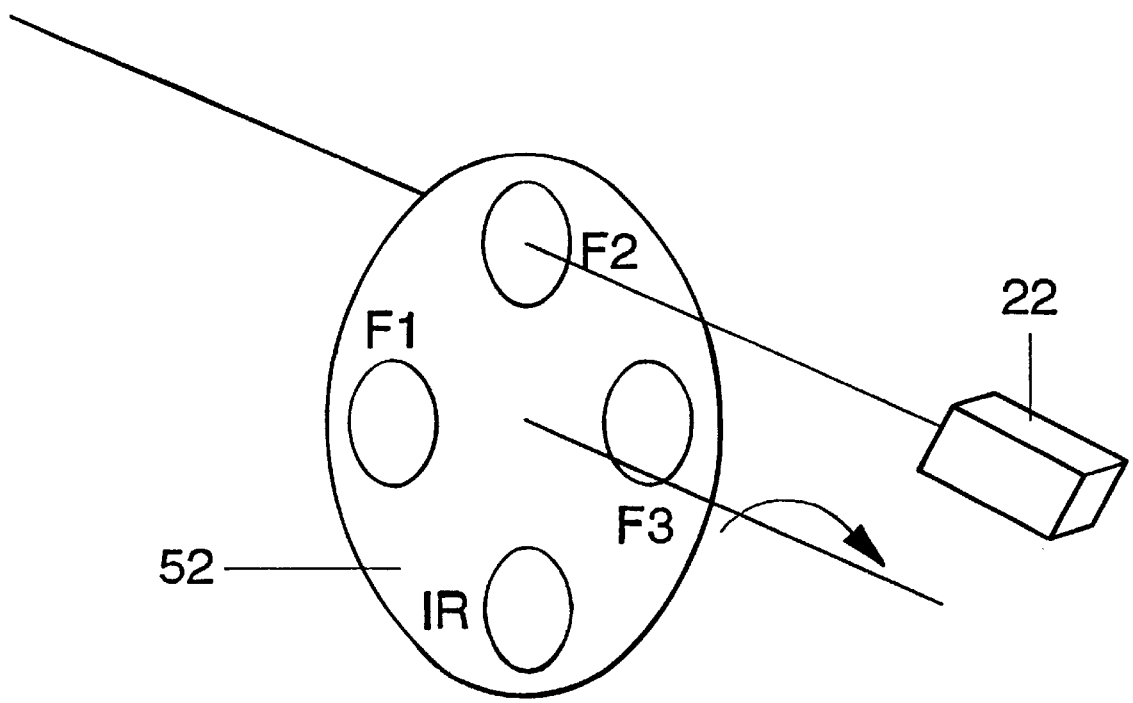
FIG. 4 is a diagrammatic view of a camera or sensor for the control system of the present invention.

As shown in FIG. 4, the camera or sensor 22 may be associated with a rotating filter member 52 having filters which only transmit the desired colors $F_1$, $F_2$, and $F_3$, such as red, green, and blue during rotation, such that the camera or sensor 22 senses and records the colors $F_1$, $F_2$, and $F_3$, sequentially or separately from the printed material which may be taken either from the current press run or from the reference press run. In addition, the filter member 52 may have an infrared (IR) filter $F_4$ in order to sense and record the energy reflected form the printed material in the infrared region. The information received by the camera or sensor 22 from the filters may be recorded in the computer or CPU for use in forming the desired data to control the inks, as previously discussed.

Figure 5:
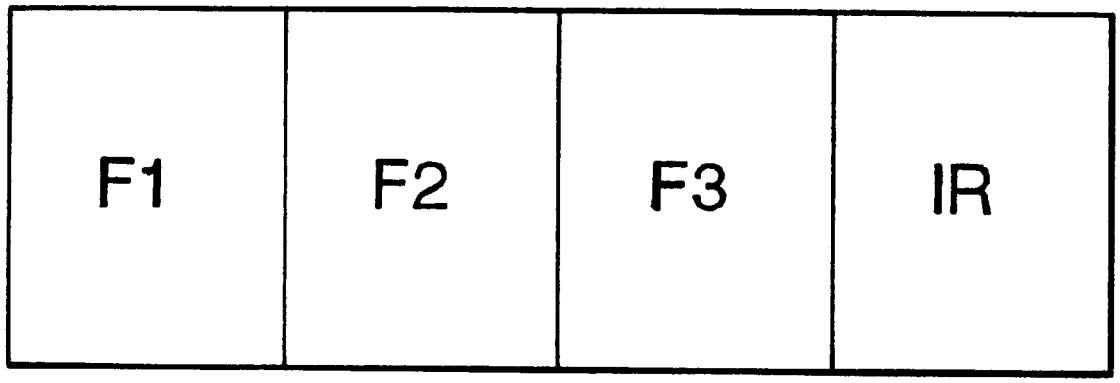
FIG. 5 is a diagrammatic view of another embodiment of the camera or sensor for the control system for the present invention.

In another form as shown in FIG. 5, the camera or sensor 22 may comprise a charge coupled device (CCD) with built in filters which converts light energy reflected from the printed material into electric energy in a video camera, i.e. $F_1$, $F_2$, $F_3$, and $F_4$, (IR), such as the distinct colors red, green, and blue in the visible region, and the near infrared energy in the infrared region, in order to supply the information to the computer 30 for storage and processing, as previously discussed.

Figure 6:
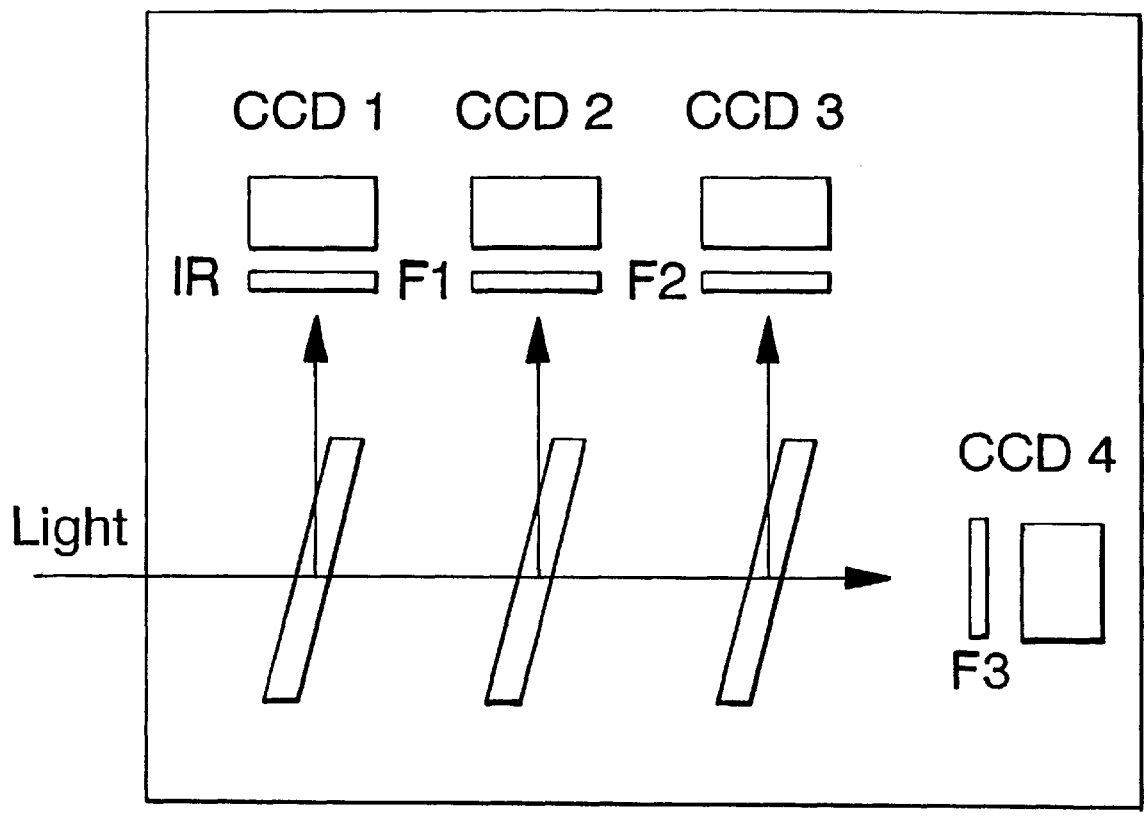
FIG. 6 is a diagrammatic view of a further embodiment of a camera or sensor for the control system of the present invention.

Another embodiment of the camera or sensor 22 of the present invention is illustrated in FIG. 6, in which like reference numerals designate like parts. In this embodiment, the camera or sensor 22 has a beam splitter in order to separate the incoming light reflected from the printed material into an infrared beam for a first CCD 1, $F_1$ such as red for a second CCD 2, $F_2$ such as green for a third CCD 3, and $F_3$ such as blue for a fourth CCD. In this embodiment, suitable prisms, lenses, or mirrors may be utilized to accomplish the beam splitting of light in order to obtain the desired color attributes in the various charge coupled devices to supply the information to the computer 30 for storage and processing in the computer 30, in a manner as previously described. Of course, any other suitable camera or sensing device may be utilized to obtain the desired colors.

Thus, a control system 10 for a printing press 11 is provided which ascertains three distinct attributes, such as colors, in the visible region of electromagnetic waves and an attribute in the infrared region of the electromagnetic spectrum for the printed inks. The control system 10 utilizes these four attributes in a four channel device to indicate and control the ink colors for use in the press 11.

Thus, the colors may be sensed from a sheet taken during a current press run, and from a sheet taken during a reference press run, after which the sensed information is utilized in order to modify ink settings of a press 11 in order to obtain repeatability of the same colors from the reference run to the current press run. In this manner, a consistent quality of colors may be maintained by the printing press 11 irrespective of the number of runs after the reference run has been made, and may be continuously used during a press run if desired.

It has been found difficult to determine the volume of each ink after multiple layers of ink have been superimposed on the paper. An ink separation process is able to determine the individual ink volumes to achieve an accurate feed rate control. The solution to this problem is set forth below.

As shown in FIG. 1, the preferred embodiment of the present invention contains an optical sensor 21 to measure the light reflection value from a printed sheet. The optical sensor 21 has four independent channels, including red, green, blue and near infrared (RGBI) channels. In this preferred embodiment, the sensor 21 is a four channel camera, which may be constructed by using a three-channel color camera 22 and a single channel black/white camera 34 as shown in FIG. 2. Each camera channel consists of a two-dimensional Charge Coupled Device image sensor (CCD). A two-dimensional CCD consists of many rows and columns of sensing elements, which are normally called pixels. When an image is formed on the surface of the CCD, the camera value obtained at each pixel location represents the amount of light reflected from the corresponding small area on sheet 14 in a particular wavelength region. Conventionally, the picture on sheet 14 is printed using a half-tone technology, which consists many tiny dots arranged in a grid pattern. The half-tone dot density is typically 85 to 100 dots per inch for newspaper and 130–200 dots per inch for commercial print. The half-tone dot to image pixel ratio should be selected between one to twenty halt-tone dots per pixel. Under this condition, the dot size of each of the process inks is considered to be consistent within any pixel boundary.

In order to determine the ink distribution on a copy with a large printed area, the following measurement, separation and analysis procedure is used. First, divide this large printed area into many small measurement areas and measure the RGBI light reflection values from each of these small areas by using the four channel sensor. Then, apply a transfer function to map each set of RGBI measurements into a set of Cyan, Magenta, Yellow and Black (CMYK) dot size value. This transfer function is called the ink separation function. This ink separation function is applied to all small areas in succession. Finally, the ink distribution over the entire printed area can be obtained by combining and analyzing the CMYK dot size values over all small areas. One important statistic is the cumulative ink zone dot size which is the summation of all the dot sizes over a particular ink zone. For each ink zone, the averaged ink zone dot size can be calculated by dividing the cumulative ink zone dot size by the total pixel count within that ink zone.

The above measurement, separation and analysis procedure can be applied to a reference copy. This produces an ink separation for the reference copy. Since a reference copy most likely conforms to the industrial standard under which the color separation function is developed, the CMYK dot size values obtained from a reference will indicate the film dot size and corresponding ink. By using the averaged ink zone dot size, the ink feed rate of each ink zone can be preset so that the product waste can be further reduced. Furthermore, this averaged ink zone dot size can also be obtained from digital images generated by the color separation process in the prepress room. Thus, the ink feed rate can be preset digitally without the need of making a film or a plate.

The similar measurement, separation and analysis procedure can be applied to a production copy also.

For each ink zone, a dot size ratio can be calculated by dividing the cumulative ink zone dot size of the production copy by the cumulative ink zone dot size of the reference. This dot size ratio between the production copy and the reference copy represents the ink volume ratio between these two copies at the specified location. Therefore, this dot size ratio can be used to determine the ink feed rate adjustment. For example, if the dot size ratio between the production copy and the reference copy is 90%, an approximate 10% of ink feed rate increment is required by this ink zone. Based upon the output characteristics of the inker and the type of oscillation rollers used, the amount of adjustment on the ink feed rate regulation device, such as an ink key, can then be determined accordingly.

Figure 13:
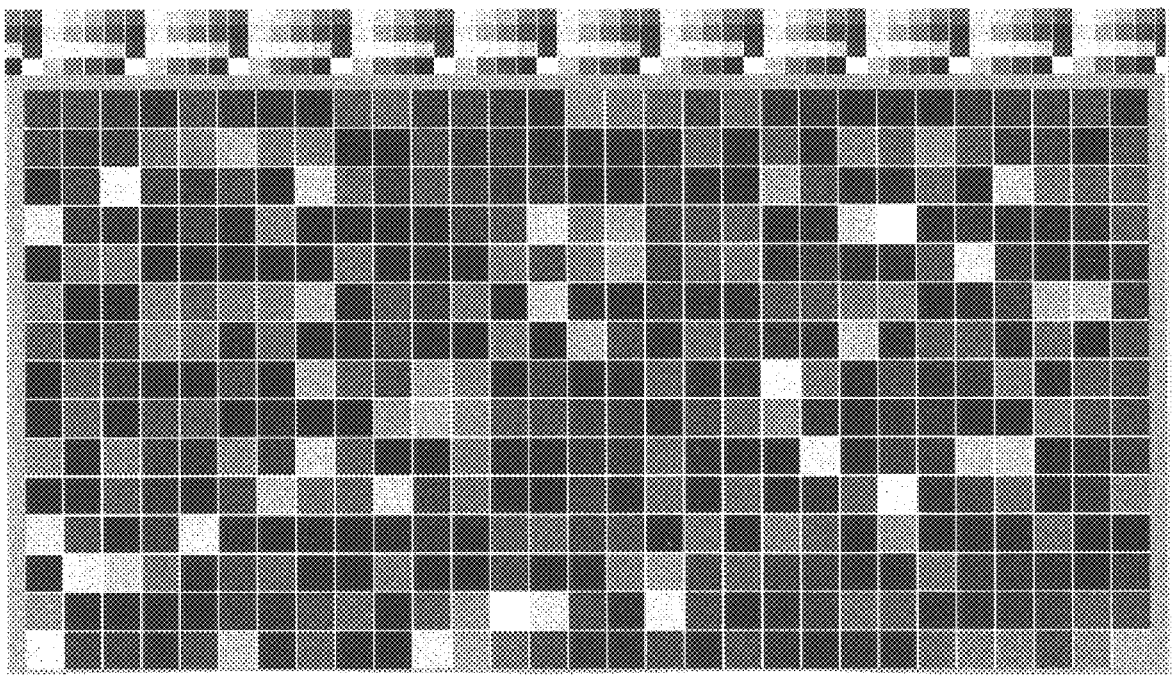
FIG. 13 is a graphic representation of a color test form with color patches arranged in a random manner.

The above mentioned ink separation function can be developed from a color test form. Such a test form should contain enough color patches to show the characteristics of the color reproduction process. To show the color of each ink, single color patches should be included. To show the characteristics of the dot gain, individual ink patches with different dot sizes should be included. Multi-color over prints should also be included to show the trapping effect with respect to different ink combinations and dot sizes. The number of color patches included in a color test form typically is in a range from a hundred to ten thousand, depending upon the accuracy required and the computational power available. Print quality control targets should also be used to ensure that this color test form is printed according to an applicable industrial standard. The substrate of the color test form should be selected to closely represent the paper used for normal production. There are many ways to layout this color test form. For example, color patches with similar hues may be grouped together so that the color variations with respect dot size changes can be easily demonstrated. However, if the dot size distribution is not even over the entire color test form, ink starvation and other uneven ink film thickness problems may become more noticeable. To minimize the unevenness of the ink film thickness over the entire printed sheet, it is preferred that color patches are arranged in a random fashion to eliminate any noticeable features. FIG. 13 shows a color test form with 435 randomly assigned color patches arranged in 29 columns and 15 rows. Control targets on top and surrounding the color patches are used for quality control purposes during printing.

After this test form is printed based upon an applicable industrial standard, a four channel camera is used to capture the charts image. The RGBI reflection values, represented by red, green, blue and infrared camera values, for each of the color patches are obtained and paired with their corresponding CMYK dot size to form a data list. The relationship between the RGBI reflection value and the CMYK dot size can be described either as a mathematical formula, a data lookup table, or a combination of formula and data lookup table. Many regression and curve fitting methods can be used for such a purpose.

The following preferred ink separation formulas comprise a set of multi-variable polynomials.

$$CDOT(r, g, b, Ir) = d_{10} + \sum_{i=1}^{P_1} (d_{1i} \times r^{s_{1i}} g^{t_{1i}} b^{u_{1i}} Ir^{v_{1i}}),$$

$$MDOT(r, g, b, Ir) = d_{20} + \sum_{i=1}^{P_2} (d_{2i} \times r^{s_{2i}} g^{t_{2i}} b^{u_{2i}} Ir^{v_{2i}}),$$

$$YDOT(r, g, b, Ir) = d_{30} + \sum_{i=1}^{P_3} (d_{3i} \times r^{s_{3i}} g^{t_{3i}} b^{u_{3i}} Ir^{v_{3i}}), \text{ and}$$

$$KDOT(r, g, b, Ir) = d_{40} + \sum_{i=1}^{P_4} (d_{4i} \times r^{s_{4i}} g^{t_{4i}} b^{u_{4i}} Ir^{v_{4i}}),$$

where,

CDOT(r,g,b,Ir), MDOT(r,g,b,Ir), YDOT(r,g,b,Ir) and KDOT(r,g,b,Ir) are dot size for cyan, magenta, yellow and black inks, respectively, $p_1$, $p_2$, $p_3$ and $p_4$ are positive integers, and $p_1$, $p_2$ and $p_3$ are normally greater than 16, $d_{10}$, $d_{20}$, $d_{30}$, $d_{40}$, $d_{1i}$, $d_{2i}$, $d_{3i}$, and $d_{4i}$ are coefficients, $s_{1i}$, $t_{1i}$, $u_{1i}$ and $v_{1i}$ are integers and not equal to zero at the same time, $s_{2i}$, $t_{2i}$, $u_{2i}$ and $v_{2i}$ are integers and not equal to zero at the same time, $s_{3i}$, $t_{3i}$, $u_{3i}$ and $v_{3i}$ are integers and not equal to zero at the same time, and $s_{4i}$, $t_{4i}$, $u_{4i}$ and $v_{4i}$ are integers and not equal to zero at the same time, and r, g, b and Ir are either the measured reflection values for the red (R), green (G), blue (B) and infrared (I) spectrum, or functions of the measured reflection values for the red (R), green (G), blue (B) and infrared (I) spectrum, respectively.

The following is an example of a set of separation formulas, which is developed by using a multi-variable linear regression process.

$CDOT = -433.17548673$

+2491.30328987 *(Log(Rcam))
−1481.00711099 *(Log(Rcam))^2
+240.09837541 *(Log(Rcam))^3
−13.91241061 *(Log(Rcam))^4

+7836.93620476 *(Log(Gcam))
−2824.13796044 *(Log(Gcam))^2
+378.67959512 *(Log(Gcam))^3
−18.83326312 *(Log(Gcam))^4

−295.59911608 *(Log(Bcam))
+48.11993348 *(Log(Bcam))^2
−0.41936097 *(Log(Bcam))^4

−8578.33708329 *(Log(IRcam))
+2618.11129503 *(Log(IRcam))^2
−404.00854644 *(Log(IRcam))^3
+22.88802460 *(Log(IRcam))^4

+292.14257318 *(Log(Rcam)) *(Log(Gcam))
+262.50449778 *(Log(Rcam)) *(Log(IRcam))
+305.82104547 *(Log(Gcam)) *(Log(IRcam))
−0.96894478 *(Log(Rcam)) *(Log(Bcam)) *(Log(IRcam))
−63.01416465 *(Log(Rcam)) *(Log(Gcam)) *(Log(IRcam))
+0.32429862 *(Log(Rcam)) *(Log(Gcam)) *(Log(Bcam)) *(Log(IRcam)).

$MDOT = -12334.31917052$

+14630.87291564 *(Log(Rcam))
−5531.55322859 *(Log(Rcam))^2
+749.90316256 *(Log(Rcam))^3
−7.79745086 *(Log(Rcam))^5
+0.05858543 *(Log(Rcam))^7

+7515.63313724 *(Log(Gcam))
−3566.86465954 *(Log(Gcam))^2
+555.72344029 *(Log(Gcam))^3
−31.85438300 *(Log(Gcam))^4

−329.06023035 *(Log(Bcam))
−427.79704317 *(Log(Bcam))^2
+66.87777635 *(Log(Bcam))^3

−7973.82988660 *(Log(IRcam))
+2239.76697190 *(Log(IRcam))^2
−377.6352808 *(Log(IRcam))^3
+22.81591892 *(Log(IRcam))^4

+647.01442332 *(Log(Rcam)) *(Log(Gcam))
−17.92388312 *(Log(Gcam))^2 *(Log(IRcam))
+901.93931832 *(Log(Bcam)) *(Log(IRcam))
−102.06091133 *(Log(Gcam))^2 *(Log(IRcam))
+11.70635047 *(Log(Gcam)) *(Log(Bcam)) *(Log(IRcam))
−83.05549291 *(Log(Rcam)) *(Log(Gcam)) *(Log(IRcam))
−0.67157246 *(Log(Rcam)) *(Log(Gcam)) *(Log(Bcam)) *(Log(IRcam)).

$YDOT = -63036.63565327$

+916.77640921 *(Log(Rcam))
−588.79835446 *(Log(Rcam))^2
+47.29849587 *(Log(Rcam))^3

+9953.03559260 *(Log(Gcam))
+2543.83493378 *(Log(Gcam))^2
+261.01788344 *(Log(Gcam))^3
−1.13441058 *(Log(Gcam))^5

+55977.29244680 *(Log(Bcam))
−24901.48375550 *(Log(Bcam))^2
+5141.17380970 *(Log(Bcam))^3
−444.81776530 *(Log(Bcam))^4
+1.48145507 *(Log(Bcam))^6

+1555.00298597 *(Log(IRcam))
−595.02012458 *(Log(IRcam))^2
+38.53305316 *(Log(IRcam))

+158.20315462 *(Log(Rcam)) *(Log(Bcam))
+169.79371748 *(Log(Rcam)) *(Log(Gcam))
+282.55365359 *(Log(Rcam)) *(Log(IRcam))
−844.99769889 *(Log(Bcam)) *(Log(Gcam))
+104.41497912 *(Log(Bcam)) *(Log(IRcam))

-continued $+166.710714*(\text{Log}(Gcam))*(\text{Log}(IRcam))$
$-15.69614927*(\text{Log}(IRcam))*(\text{Log}(Rcam))^\wedge 2$
$+115.32357065*(\text{Log}(Gcam))*(\text{Log}(Bcam))^\wedge 2$
$-6.73462248*(\text{Log}(Rcam))*(\text{Log}(Gcam))*$
$(\text{Log}(Bcam))*(\text{Log}(IRcam))$.

$KDOT = 390.5398046$ $-68.23711294*(\text{Log}(IRcam))$
$-7.8477893*(\text{Log}(IRcam))^\wedge 2$
$+1.27058861*(\text{Log}(IRcam))^\wedge 3.$ $+1.6835166*(\text{Log}(Rcam))$
$+1.2878716*(\text{Log}(Gcam))$
$-0.96497856*(\text{Log}(Bcam))$ In these formulas, CDOT, MDOT, YDOT and KDOT are dot sizes of the process inks. Rcam, Gcam, Bcam and IRcam are camera values of each camera channel. A "Log" denotes the logarithm function. A "^" sign denotes the power function. For example, $(\text{Log}(IRcam))^\wedge 2$ represents the square of the logarithm of the Infrared camera value.

In each formula, a group of terms which depends upon only one variable (camera value) can be pre-calculated and implemented as a lookup table. For example, the following constant and four "Log(Rcam)" terms $-433.17548673$
$+2491.30328987*(\text{Log}(Rcam))$
$-1481.00711099*(\text{Log}(Rcam))^\wedge 2$
$+240.09837541*(\text{Log}(Rcam))^\wedge 3$
$-13.91241061*(\text{Log}(Rcam))^\wedge 4$ in the CDOT formula, depend only upon red camera value. Therefore, it is convenient to calculate these terms separately for all possible red camera values beforehand, and store the results in a lookup table. By utilizing as many lookup tables as possible, the process time required to separate an image will be greatly reduced.

Since the color test form contains enough color patches to represent many important characteristics of the printing process, these ink separation formulas can accurately convert the red, green, blue and infrared camera values into the cyan, magenta, yellow and black ink dot size values. In these formulas, dot size values are explicitly expressed as dependent variables. Therefore, the need of solving multi-variable non-linear simultaneous equations has been completely eliminated. Because many terms of these formulas are pre-calculated and implemented as lookup tables, time required to calculate these formulas is greatly reduced.

The accuracy of the ink separation process and the ink feed rate adjustment highly depends upon the accuracy of light reflection values measured by the four channel sensors. Usually, the performance, such as accuracy, repeatability and resolution, of the sensing device is determined for non-functional reasons, such as cost of the sensor. To overcome difficulties caused by this type of possible hardware limitation, the following methods can be used to improve the ink feed rate control accuracy.

It is very common that the reflectance of a dark shadow area on a commercial print is less than 1% (density>2). To reliably measure such a shadow area, the signal to noise ratio of the four channel sensors should be greater than 1000:1 or 60 db. This is a very high requirement considering the cameras which are available in the market place at this time. Normally, when an 8-bit analog camera is used, the signal to noise ratio of the RGBI light reflection values which are provided to the ink separation is only about 100:1, or 40 db. Thus, the measurement from a dark shadow area becomes less reliable. To maintain the required ink feed rate adjustment accuracy, it is recommended that dark shadow areas having a heavy ink coverage should be masked out and therefore not contribute to the ratio if other lighter ink coverage areas are available within the same ink zone for ink control purpose.

Alignment and synchronization among four camera channels are also very important. If any channel is not synchronized with other channels, separation error will occur. This type of error is more noticeable near sharp edges where the ink dot size changes rapidly. Fortunately, most printed images contain a lot of low spatial frequency features. Therefore, this type of edge effect in most situations is tolerable. If not, sharp edges where the ink dot size changes rapidly should be masked out from the corresponding ink image.

The alignment between a production copy and a reference copy is also important. Sometimes, a production copy might be placed under the camera field of view in a position other than that occupied by a reference copy when its image was captured. The following method can be used to realign the production image with the reference image. First, define a plurality of object models in the reference image and record the position of each model in the reference image. Then, find the corresponding position of these object models in the production image. Image translation functions, such as a bi-linear translation function, can be defined to realign the production copy with the reference copy automatically.

The foregoing detailed description has been given for clearness of understanding only, and no unnecessary limitations should be understood therefrom, as modifications will be obvious to those skilled in the art.

What is claimed is:

1. An ink separation device for a printing press ink feed control system, comprising:

means for printing a color chart having randomly distributed color patches, and recording cyan, magenta, yellow and black ink dot sizes (CMYK) for each color patch;

means for measuring the red, green, blue and infrared reflection values (RGBI) of each color patch in the color chart, and recording the measured RGBI values for each of the color patches in the color chart;

means for employing the measured RGBI values developed from the color patches to define a transfer function which maps four-dimensional RBGI vectors into four-dimensional CMYK vectors;

means for measuring reference RGBI reflection values from a reference copy, and employing the transfer function to convert the reference RGCI reflection values into corresponding reference CMYK ink dot size values;

means for measuring production RGBI reflection values from a production copy, and employing the transfer function to convert the production RGBI reflection values into corresponding induction CMYK ink dot size values;

means for developing an ink zone dot size ratio between the production cumulative ink zone dot size and the reference cumulative ink zone dot size for the ink zone; and means for employing the ink zone dot size ratio to adjust an ink feed rate of the press.

2. A device as defined in claim 1 further comprising means for masking out areas with heavy ink coverage if lighter ink coverage areas are available within the same ink zone.

3. A device as defined in claim 1 further comprising means for masking out edges where the ink dot size changes rapidly.

4. A device as defined in claim 1 further comprising means for aligning the production image with the reference image.

5. A device as defined in claim 1 further comprising means for presetting the ink feed rate.

6. An ink separation process for performing ink feed control of a printing press, said printing press including a plurality of ink zones each of which has an adjustable ink feed rate, the process comprising the steps of:
   providing a four channel optical sensor for sensing light reflection value in red, green, blue and near infrared spectral regions;
   defining a transfer function which maps a set of red green, blue and near infrared reflection values into a set of cyan, magenta, yellow and black ink dot size values;
   employing the four channel optical sensor to obtain sets of red, green, blue and near infrared reflection values from a reference copy;
   employing the transfer function to convert each set of the red, green, blue and near infrared reflection values acquired from the reference copy by the four channel optical sensor into a corresponding set of cyan, magenta, yellow and black dot size values;
   employing the four channel optical sensor to obtain sets of red, green, blue and near infrared reflection values from a production copy;
   employing the transfer function to convert each set of the red, green, blue and near infrared reflection values acquired from the production copy by the four channel optical sensor into a corresponding set of cyan, magenta, yellow and black dot size values:
   calculating an ink volume ratio between said production copy and said reference copy for each ink zone based upon the sets of cyan, magenta, yellow, and black ink dot sizes developed from the reference and production copies; and,
   adjusting the ink feed rates of each ink zone of the press based upon said ink volume ratios.

7. A process as defined in claim 6 wherein said four channel optical sensor comprises a sensor structure selected from a group consisting of a single element detector, a one-dimensional linear detector and a two-dimensional area detector.

8. A process as defined in claim 6 wherein the surfaces of the reference and production copies are divided into small areas by using a two-dimensional CCD image sensor, and wherein each of said small areas maps to a pixel of said CCD image sensor.

9. A process as defined in claim 8 wherein the size of said small areas is approximately one to twenty times larger than the distance between two adjacent ink dots on said color chart.

10. A process as defined in claim 6 wherein the step of defining the transfer function is performed by measuring light reflection values over the surface of a color chart having a plurality of color patches to represent the color of the paper and each of the cyan, magenta, yellow and black inks, dot gain, and trapping between two or more different inks.

11. A process as defined in claim 10 wherein said color patches are arranged on the color chart in a random fashion to minimize the unevenness of the ink distribution.

12. A process as defined in claim 10 wherein the number of said color patches included in said color chart is approximately in a range from one hundred to ten thousand.

13. A process as defined in claim 10 wherein said color chart includes a set of print quality control targets to enable said color chart to be printed under an applicable industrial quality control standard.

14. A process as defined in claim 6 wherein said cyan, magenta, yellow and black ink dot size values are given as explicitly dependent variables in the transfer function.

15. A process as defined in claim 14 wherein said transfer function comprises a set of multi-variable polynomial formulas.

16. A process as defined in claim 15 wherein said multi-variable polynomial formulas use said sets of red, green, blue and near infrared reflection values as variables.

17. A process as defined in claim 15 wherein said multi-variable polynomial formulas use logarithms of said sets of red, green, blue and near infrared camera values as variables.

18. A process as defined in claim 15 wherein a plurality of terms of said multi-variable polynomial formulas are pre-calculated and implemented as a set of look-up tables to speed the implementation of said transfer function.

19. A process as defined in claim 15 wherein said set of multi-variable polynomial formulas is developed by a multi-variable linear regression method.

20. A process as defined in claim 6 wherein said four channel optical sensor is a four channel video camera.

21. A process as defined in claim 6 wherein said ink volume ratio for each ink zone is calculated by dividing a cumulative ink zone dot size of said production copy by a cumulative ink zone dot size of said reference copy on an ink-zone-by-ink-zone basis.

22. An ink separation device for a four-color print, said print containing carbon particles in its black material, said ink separation device comprising:
   a four channel optical sensor for sensing reflected light in red, green, blue and near infrared spectral regions;
   means for measuring the distribution of the reflected light over the surface of said four-color print in the red, green, blue and near infrared spectral regions, said measuring means including means for dividing the surface of said four-color print into a plurality of small areas and means for obtaining a set of red, green, blue and near infrared reflection values from each of said small areas by using said four channel optical sensor;
   means for defining a transfer function which maps a set of red, green, blue and near infrared refection values into a set of cyan, magenta, yellow and black ink dot size values, said transfer function comprising a set of multi-variable polynomials developed by a multi-variable linear regression method to describe said ink dot size values as dependent variables explicitly;
   means for converting each set of the red, green, blue and near infrared reflection values acquired by said measuring means into a corresponding set of cyan, magenta, yellow and black dot size values by using said transfer function over each of said small areas.

23. An ink separation process for performing ink feed control in a printing press, comprising the steps of:
   measuring reference red, green, blue and infrared (RGBI) reflection values from a reference copy;
   employing a transfer function to convert the reference RGBI reflection values into corresponding reference cyan, magenta, yellow and black (CMYK) ink dot size values;
   developing a reference cumulative ink zone dot size for an ink zone from the reference CMYK ink dot size values;
   measuring production RGBI reflection values from a production copy;

employing the transfer function to convert the production RGBI reflection values into corresponding production CMYK ink dot size values;

developing a production cumulative ink zone dot size for the ink zone from the production CMYK ink dot size values;

developing an ink zone dot size comparison between the production cumulative ink zone dot size and the reference cumulative ink zone dot size for the ink zone; and employing the ink zone dot size comparison to adjust an ink feed rate of the press.

24. An ink separation process as defined in claim 23 wherein the ink zone dot size comparison comprises a ratio.

25. An ink separation process for performing ink feed control in a printing press, comprising the steps of:

printing a color chart having randomly distributed color patches;

measuring red, green, blue and infrared reflection values (RGBI) of each color patch in the color chart;

recording the measured RGBI values for each of the color patches in the color chart;

recording cyan, magenta, yellow and black (CMYK) ink dot size values for each of the color patches in the color chart;

employing the measured RGBI values developed from the color patches to define a transfer function which maps RGBI reflection values into CMYK ink dot size values;

measuring reference RGBI reflection values from a reference copy, employing the transfer function to convert the reference RGBI reflection values into corresponding reference CMYK ink dot size values, developing a reference cumulative ink zone dot size for an ink zone from the reference CMYK ink dot size values;

measuring production RGBI reflection values from a production copy;

employing the transfer function to convert the production RGBI reflection values into corresponding production CMYK ink dot size values;

developing a production cumulative ink zone dot size for the ink zone from the production CMYK ink dot size values;

developing an ink zone dot size ratio between the production cumulative ink zone dot size and the reference cumulative ink zone dot size for the ink zone; and employing the ink zone dot size ratio to adjust an ink feed rate of the press.

26. An ink separation device for a printing press ink feed control, comprising:

a four channel optical sensor for measuring reference RGBI reflection values from a reference copy and production RGBI reflection values from a production copy;

means for employing a transfer function to convert the reference RGBI reflection values into corresponding reference CMYK ink dot size values and the production RGBI reflection values into corresponding production CMYK ink dot size values;

means for developing a reference cumulative ink zone dot size for an ink zone from the reference CMYK ink dot size values and a production cumulative ink zone dot size for the ink zone from the production CMYK ink dot size values;

means for developing an ink zone dot size ratio between the production cumulative ink zone dot size and the reference cumulative ink zone dot size for the ink zone; and means for employing the ink zone dot size ratio to adjust an ink feed rate of the press.

* * * * *

UNITED STATES PATENT AND TRADEMARK OFFICE
CERTIFICATE OF CORRECTION

PATENT NO. : 5,903,712
DATED : May 11, 1999
INVENTOR(S) : Wang et al.

It is certified that error appears in the above-identified patent and that said Letters Patent is hereby corrected as shown below:

Col. 14, line 56: After "...into corresponding", delete "induction" and insert -- production --.

Col. 15, line 13: After "...reflection", delete "value" and insert -- values --.

Col. 15, line 15: After "...a set of red", insert -- , --.

Signed and Sealed this

Second Day of November, 1999

Attest:

Q. TODD DICKINSON

*Attesting Officer*       *Acting Commissioner of Patents and Trademarks*